United States Patent [19]

Ikarimoto

[11] 4,034,498
[45] July 12, 1977

[54] BEAM ASSEMBLY FOR FISHING

[76] Inventor: Yasuaki Ikarimoto, 1-9, Kita-Nekuromatsu, Sendai, Miyagi, Japan

[21] Appl. No.: 649,210

[22] Filed: Jan. 15, 1976

[51] Int. Cl.² ..................................... A01K 97/00
[52] U.S. Cl. ................................. 43/15; 43/42.74
[58] Field of Search ............... 43/15, 42.74, 36, 37, 43/16

[56] References Cited

U.S. PATENT DOCUMENTS

| | | | |
|---|---|---|---|
| 814,624 | 3/1906 | Robinson | 43/36 |
| 3,559,326 | 2/1971 | Henderson | 43/15 |
| 3,650,063 | 3/1972 | Pierce | 43/42.74 |
| 3,744,178 | 7/1973 | Denny | 43/42.74 |

*Primary Examiner*—Warner H. Camp
*Attorney, Agent, or Firm*—Martin A. Farber

[57] ABSTRACT

A beam assembly for fishing, in which first and second elastic beams are mounted on a weight support and adapted to separate from each other at the free ends thereof. A leader is connected to the outboard end of the first beam and engages with an end of the second beam. The first and second beams are maintained in engagement with each other at the free ends thereof and disengageable from each other when the leader is pulled for thereby striking a fish.

9 Claims, 4 Drawing Figures

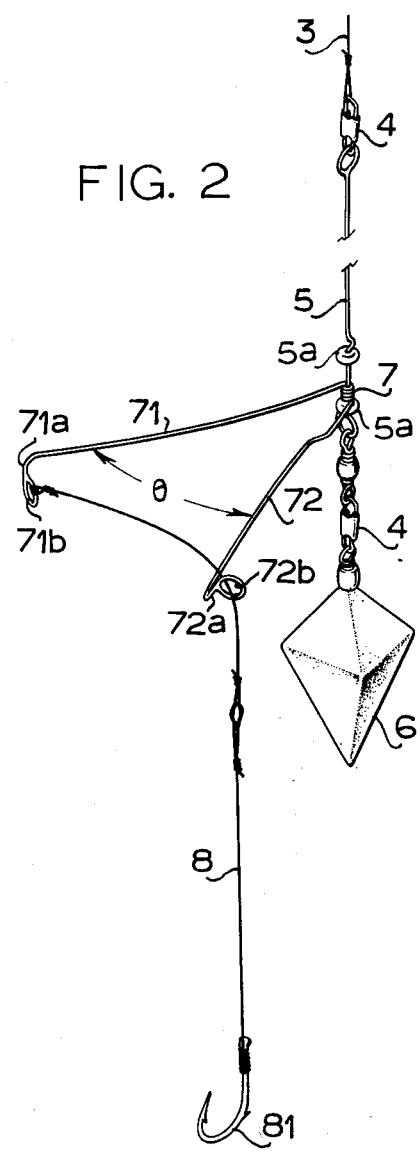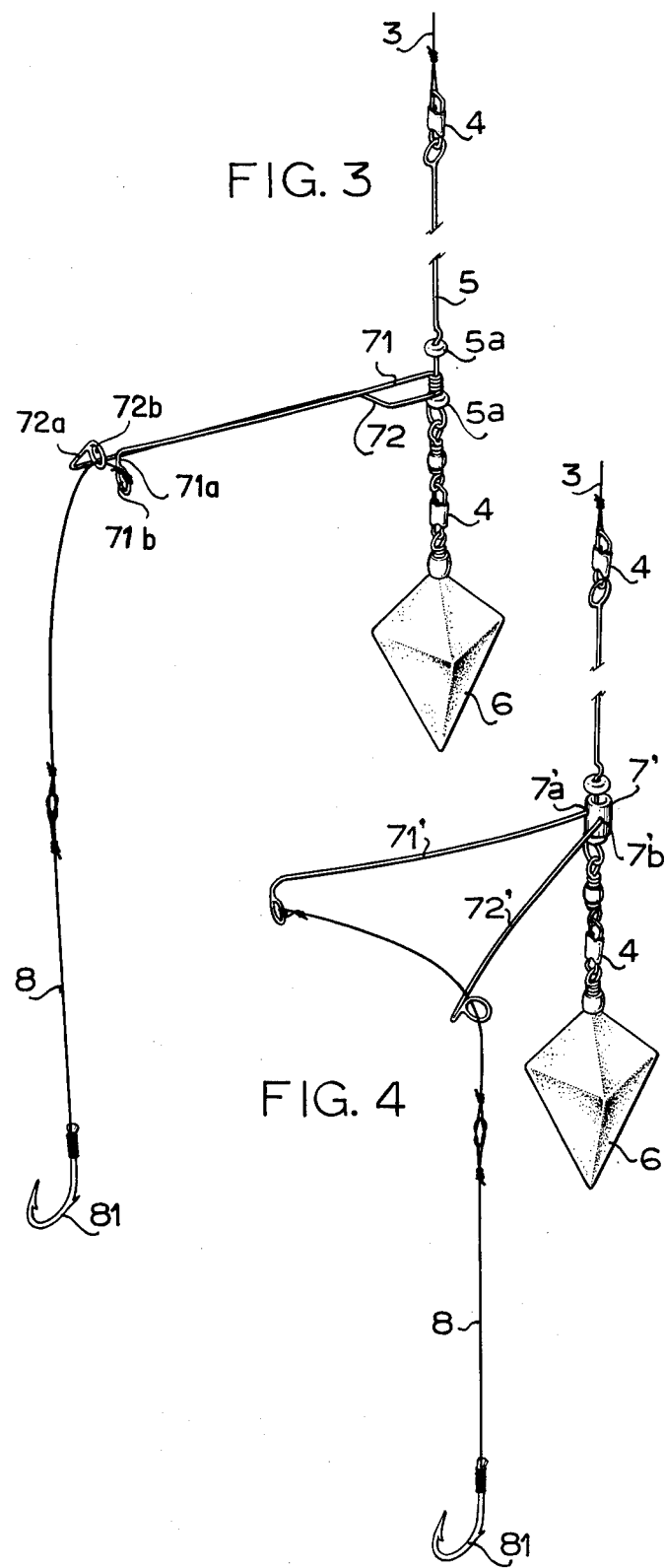

BEAM ASSEMBLY FOR FISHING

The present invention relates to beam assemblies for fishing and, more particularly, to a beam assembly which is sensitive to a bite and affords mechanical striking of a fish.

A beam assembly, which includes a single beam or double beam, for example, serves to prevent a line from slackening and precludes the influence which would be provided by a weight adapted to hold a hook in a desired place under water.

A weight if directly fitted to a line will make it difficult for an angler to strike a fish since a bite cannot be transmitted sensitively to the line, although it may be effective to sink a hook down to a desired depth. With this in view, a beam assembly intervenes a lines and a leader so that an angler can strike a fish with ease when there is a bite.

Striking a fish is one of the most difficult works in the art of fishing, however. The only possible way to grasp the timing and degree of the striking work upon feeling a bite is considered to be an accumulation of experience.

It is therefore an object of the present invention to provide an improved beam assembly for fishing which enables automatic and mechanical striking of a fish simultaneously with the feeling of a bite.

Briefly described, a beam assembly according to the invention includes a coil spring whose opposite ends are extended horizontally to form elastic beams, a leader having one end thereof fixed to one of the beams and passed through a hoop of the other beam, wherein the beams are normally held in engagement with each other against their resilient tendencies before the beam assembly is introduced into water and, in response to a bite, instantaneously disengaged from each other to strike a fish with the aid of the resilient returning force exerted by the upper beam.

Drawings illustrate a preferred embodiment of the present invention, in which:

FIG. 2 is a fragmentary perspective view of the beam assembly shown in FIG. 1;

FIG. 3 show beams of the assembly illustrated in FIG. 2 in a stressed operative position; and FIG. 4 is a perspective view showing another preferred embodiment of a beam assembly according to the present invention.

Figure 1:
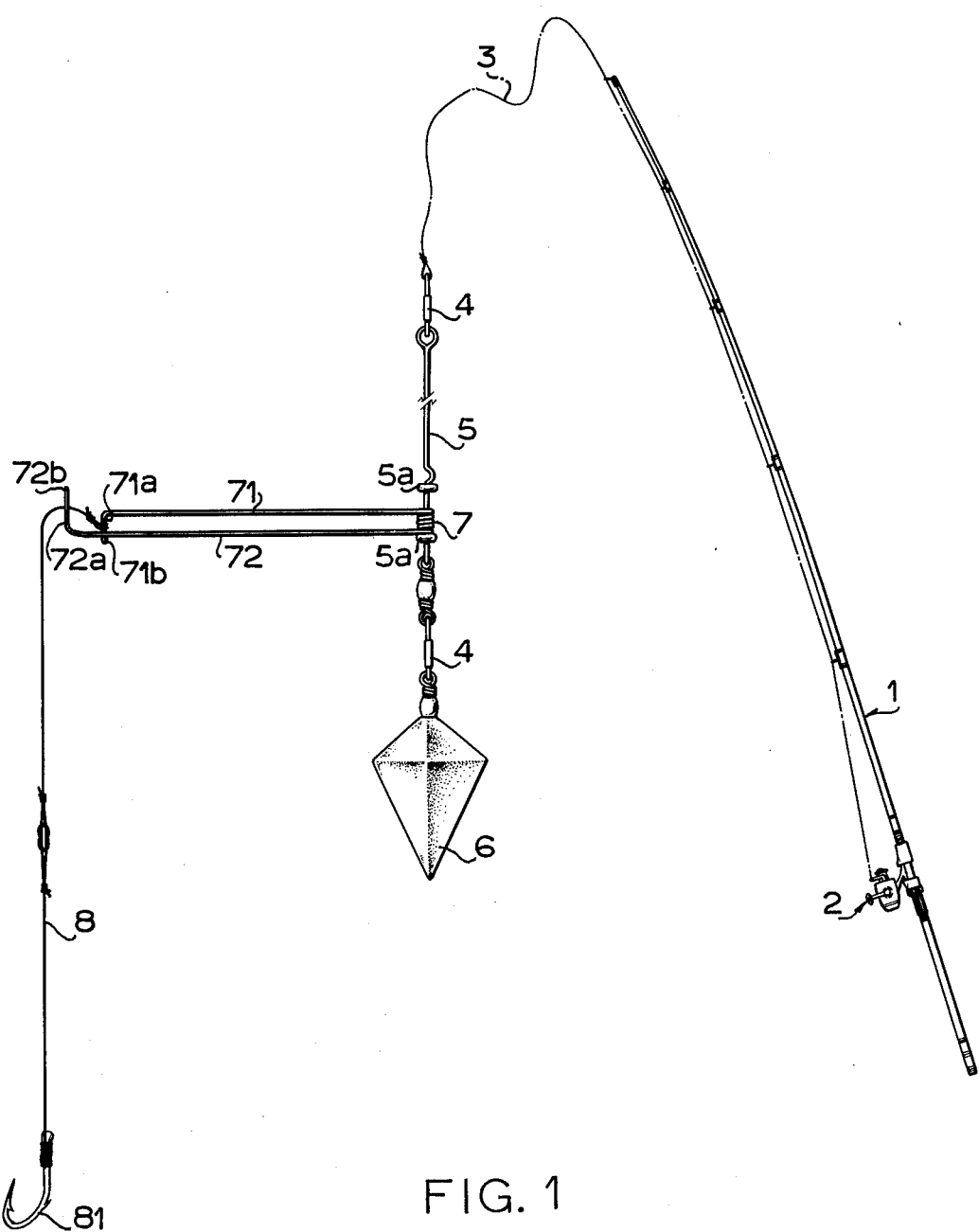
FIG. 1 is a schematic perspective view showing an overall arrangement of a fishing tackle including a beam assembly according to the present invention.

A preferred embodiment of the present invention will now be described with reference to the accompanying drawings. In FIG. 1, reference numeral 1 designates a fishing rod mounting a reel 2 to the base end thereof. A line 3 extends as shown out of a roll thereof would round the reel 2 in such a manner as to be taken up when desired. A weight support 5 is connected at its upper end with the extreme end of the line 3 through a first or upper member 4 and at its lower end with a weight 6 through a second or lower member 4. The members 4 serve to prevent the line from twisting while functioning as connecting means.

The weight support 5 is provided with stops 5a in the form of hoops or globes which are spaced from each other by a desired distance. The stops 5a serve to prevent the coil spring from slipping out of engagement with the weight support 5.

The coiled spring 7 is supported by the weight support 5 between the stops 5a and has its opposite ends extending perpendicular to the weight support 5 to form first and second elastic beams 71 and 72. It is to be noted that the first and second elastic beams 71 and 72 may be chosen to have desired lengths in dependence on the kinds of fishes and preferably range from about 5 to 15 cm. The beams 71 and 72 are angled at the degree of $\theta$ (FIG. 2) in a manner as illustrated, and can be held in engagement with each other at the free ends thereof against their resilient tendencies. To this end, the second beam 72 is formed with a preferably upwardly bent portion 72a and the first beam 71 is engageable at its free end with the end portion of the second beam 72. The first beam 71 is formed at its free end with a preferably downwardly bent hoop 71a to fix a leader. The hoop 71a is bent downwardly perpendicular to the first beam 71 to form a hook 71b. On the other hand, the second beam 72 is formed at its free end with a hoop integral with upwradly bent portion 72a through which the lead passes. The first and second beams 71 and 72 are initially angled at the degree of $\theta$ and, thereafter, brought into engagement at their free ends with each other by hooking the second beam 72 by the hook 71b of the first beam 71.

A leader 8 is fixedly connected at one end to the outboard end of the beam 71, and a hook 81 is fitted to the other end of the leader 8.

Procedure for fishing with a beam assembly thus constructed according to the invention will be described hereinafter. A bait is, of course, put on the hook first of all while the kind of the bait will differ from one game fish to another.

The outboard ends of the first and second beams 71 and 72 are brought into engagement with each other and the second beam 72 is retained by the hook 71b of the first beam 71 against the resilient tendencies thereof. The beams 71 and 72 tend to return to the original unstressed positions and also to return to different vertical planes due to the twist of the coil spring 7.

As a game fish bites the hook 81 to draw the leader downward, the second beam 72 having the hoop 72a through which the end of the leader passes is also urged downward so that the second beam 72 is disengaged from the first beam 71. Thus, the first and second beams 71 and 72 are returned to their original unstressed positions and, in this instance, the leader 8 is pulled upward whereby the hook 81 catches the mouth of the fish.

It will now be appreciated from the foregoing that, according to the present invention, not only a bite can be transmitted exactly to a leader but a fish can be struck in an artificial manner; even a slightest bite hardly felt by the hands can return first and second beams extending from opposite ends of a coil spring to unstressed positions thereof.

In another preferred embodiment shown in FIG. 4, the coil spring 7 is replaced by a sleeve 7' which is mounted between the stops of the weight support. The sleeve 7' is formed at its periphery with bores 7'a and 7'b into which ends of first and second beams 71' and 72' are fitted. The first and second beams 71' and 72' are brought into engagement with each other and operate in a manner as previously mentioned.

What is claimed is:

1. A beam assembly for fishing, comprising a vertically alignable weight support having one end thereof connected with a line, a weight connected to the other end of said weight support, a pair of horizontally extending elastic beams mounted on said weight support and adapted to separate from each other at the free ends thereof, a leader connected to the outboard end of one of said elastic beams and engaging with an end of another one of said beams, and means for maintaining said beams in releasable engagement with each other, said beams being disengageable from each other when said leader is pulled for thereby striking a fish.

2. A beam assembly as defined in claim 1, further comprising another pair of elastic beams mounted on said weight support, and another leader associated with said another pair of elastic beams.

3. A beam assembly as defined in claim 1, further comprising hoops provided on said weight support and serving as stops for providing mounting position of said beams.

4. A beam assembly as defined in claim 1, further comprising engaging globes disposed on said weight support and serving as stops for providing mounting position of said beams.

5. A beam assembly as defined in claim 1, wherein said beams each include a hoop formed on said free ends thereof, one of said hoops projecting upwardly and the other of said hoops projecting downwardly, defining cooperating hooks, respectively, at least one of said hooks of one of said beams is arranged to be brought into releasable engagement with the other of said beams, said leader passes through one of said hoops and is secured to the other of said hoops, the latter constituting said outboard end.

6. A beam assembly as defined in claim 5, wherein one of said horizontally extending beams if formed with a horizontally oriented offset bend directed toward the other of said beams so that said beams overlappingly cross over each other in the engagement position in a direction opposite a direction of separation of said beams.

7. A beam assembly as defined in claim 6, further comprising a spring having a plurality of coils defining an axis and integrally connected to said pair of elastic beams, the latter oriented perpendicularly to said axis, said coils are axially vertically disposed about said weight support with said beams horizontally extending therefrom.

8. A beam assembly as defined in claim 6, wherein said beam with said offset bend has said upwardly projecting hoop and is longer than the length of the other beam and said downwardly projecting hoop is partially disposed at a lower level than that of said other beam in the engagement position said leader is secured to the downwardly projecting hoop.

9. The beam assembly as defined in claim 1, further comprising a sleeve axially disposed on said weight support, said beams include inner ends angularly mounted relative to each other in said sleeve.

* * * * *

UNITED STATES PATENT AND TRADEMARK OFFICE
CERTIFICATE OF CORRECTION

PATENT NO. : 4034498
DATED : July 12, 1977
INVENTOR(S) : Yasuaki Ikarimoto

It is certified that error appears in the above-identified patent and that said Letters Patent are hereby corrected as shown below:

COLUMN 1: line 17,     "lines" should read --line-- line 56,     "would" should read --wound--

COLUMN 2: line 20,     "upwradly" should read --upwardly--

Signed and Sealed this

*Fourth* Day of *October 1977*

[SEAL]

Attest:

RUTH C. MASON
*Attesting Officer*

LUTRELLE F. PARKER
*Acting Commissioner of Patents and Trademarks*